(12) United States Patent
Perreault (10) Patent No.: US 10,056,057 B2
(45) Date of Patent: Aug. 21, 2018

(54) RESONANT MODULATION OF VARIFOCAL LIQUID MEMBRANE LENS TO PROVIDE MULTIPLE CONCURRENT FOCAL PLANES IN VR DISPLAY FOR REALISTIC FOCUS CUES

(71) Applicant: Google Inc., Mountain View, CA (US)

(72) Inventor: John D. Perreault, Mountain View, CA (US)

(73) Assignee: Google LLC, Mountain View, CA (US)

( * ) Notice: Subject to any disclaimer, the term of this patent is extended or adjusted under 35 U.S.C. 154(b) by 96 days.

(21) Appl. No.: 15/135,970

(22) Filed: Apr. 22, 2016

(65) Prior Publication Data

US 2017/0301313 A1   Oct. 19, 2017

Related U.S. Application Data

(60) Provisional application No. 62/321,819, filed on Apr. 13, 2016.

(51) Int. Cl.
 *G09G 5/12*   (2006.01)
 *G02B 26/00*   (2006.01)
 (Continued)

(52) U.S. Cl.
 CPC ............. *G09G 5/12* (2013.01); *G02B 3/14* (2013.01); *G02B 26/004* (2013.01);
 (Continued)

(58) Field of Classification Search
 CPC ........... G09G 5/12; G09G 3/003; G09G 5/10; G09G 2230/00; G09G 2310/08;
 (Continued)

(56) References Cited

U.S. PATENT DOCUMENTS

2012/0113092 A1 *  5/2012  Bar-Zeev ............. G02B 27/017
 345/419

FOREIGN PATENT DOCUMENTS

WO   2012175939   12/2012

OTHER PUBLICATIONS

Yi-Pai Huang, et al., "Adaptive Liquid Crystal Lens (LC-Lens) Array for 3D Display and Capturing," Biomedical Optics and 3D Imaging OSA 2012, Jan. 1, 2012, pp. 1-3.

(Continued)

*Primary Examiner* — Andrew Sasinowski (57) ABSTRACT

A near-eye display system includes a display assembly comprising at least one display panel and a display driver to drive the display assembly to display a sequence of frames in a low-persistence mode based on a frame clock signal having a first frequency. The near-eye display system further includes a pair of liquid membrane lenses facing the display assembly, and a lens driver having an output coupled to an input of each of liquid membrane lenses of the pair, the lens driver to generate at the output a periodic, continuously variable driving signal having a second frequency, wherein the first frequency is an integer multiple of the second frequency. As the liquid membrane lenses are synchronized with the low-persistence display of the sequence of frames, each displayed frame is perceived through the liquid membrane lenses at a different nearly constant focal depth, and thus creating a perception to the user of multiple focal planes in the displayed imagery.

19 Claims, 5 Drawing Sheets

(51) Int. Cl.
    G06F 1/04      (2006.01)
    G09G 5/10      (2006.01)
    G02B 3/14      (2006.01)
    G06T 19/00     (2011.01)
    G09G 3/00      (2006.01)
    G02B 27/01     (2006.01)
(52) U.S. Cl.
    CPC .......... *G02B 27/0172* (2013.01); *G06F 1/04* (2013.01); *G06T 19/006* (2013.01); *G09G 3/003* (2013.01); *G09G 5/10* (2013.01); *G09G 2230/00* (2013.01); *G09G 2300/0469* (2013.01); *G09G 2310/08* (2013.01)
(58) Field of Classification Search
    CPC .............. G09G 2300/0469; G02B 3/14; G02B 26/004; G02B 27/0172; G06T 19/006; G06F 1/04
    See application file for complete search history.

(56)    References Cited

OTHER PUBLICATIONS

Yung-Yuan Kao, et al., "A New Dual-Frequency Liquid Crystal Lens with Ring-and-Pie Electrodes and a Driving Scheme to Prevent Disclination Lines and Improve Recovery Time," Sensors, ISSN 1424-8220, May 18, 2011, pp. 5403-5413.
Gregory Kramida, et al., "Resolivng the Vergence-Accomodation Conflict in Head Mounted Displays," IEEE Trans. Visualization and Computer Graphics, Aug. 27, 2015, pp. 1-17.
Sheng Liu, et al., "Time-Multiplexed Dual-Focal Plane Head-Mounted Display with a Liquid Lens," Optics Letters, vol. 34, No. 11, May 21, 2009, pp. 1642-1644.
Sheng Liu, et al., "A Novel Prototype for an Optical See-Through Head-Mounted Display with Addressable Focus Cues," IEEE Trans. Visualization and Computer Graphics, vol. 16, No. 3, Aug. 10, 2010, pp. 381-393.
Gordon D. Love, et al., "High-Speed Switchable Lens Enables the Development of a Volumetric Stereoscopic Display," Optics Express 15716, vol. 17, No. 18, Aug. 20, 2009, pp. 1-10.
H. Oku, et al., "High-Speed Liquid Lens with 2 MS Response and 80.3 NM Root-Mean-Square Wavefront Error," Appl. Phys. Lett. 94, 221108 (2009), Jun. 2, 2009, pp. 1-4.
"Electrically Tunable Large Aperture Lens, EL-16-40-TC," Optotune Switzerland AG, www.optotune.com, Jan. 13, 2016, pp. 1-9.

Sowmya Ravikumar, et al., "Creating Effective Focus Cues in Multi-Plane 3 Displays," Optics Express 20940, vol. 19, No. 21, Oct. 6, 2011, pp. 1-13.
Shiro Suyama, et al., "Three-Dimensional Display System and Dual-Frequency Liquid-Crystal Varifocal Lens," Jpn. J. Appl. Phys. vol. 39 (2000), Dec. 6, 1999, pp. 480-484.
"Arctic 316, Arctic 316-AR850-MAS 130129" accessed from «http://http://varioptic.com/products/variable-focus/arctic-316/», on Apr. 1, 2016.
"Artctic 316-AR850", Arctic 316, MADS—131029, <http://www.optics-concept.fr/optique/pdf/651_pagesdynadocs5582b339a2f4e.pdf>, accessed on Apr. 22, 2016, 1 page.
Suyama, S., et al.,"Three-Dimensional Display System with Dual-Frequency Liquid-Crystal Varifocal Lens", Jpn. J. Appl. Phys., vol. 39, Jan. 2000, 6 pages.
Ravikumar, S., et al., "Creating Effective Focus Cues in Multi-Plane 3D Displays", Optics Express, vol. 19, No. 21, Oct. 10, 2011, 13 pages.
"Electrically Tunable Large Aperture Lens", EL-16-40-TC, Optotune,Jan. 2016, 9 pages.
Oku, H. and Ishikawa, M., "High-Speed Liquid Lens with 2 MS Response and 80.3 nm Root-Mean-Square Wavefront Error", Applied Physics Letters, vol. 94, Jan. 2009, 4 pages.
Liu, S., "A Novel Prototype for an Optical See-Through Head-Mounted Display with Addressable Focus Cues", IEEE Transactions on Visualization and Computer Graphics, vol. 16, No. 3, Jun. 2010, 13 pages.
Liu, S., and Hua, H., "Time-Multiplexed Dual-Focal Plane Head-Mounted Display with a Liquid Lens", Optics Letters, vol. 34, No. 11, Jun. 1, 2009, 3 pages.
Kramida, G. and Varchney, A., "Resolving the Vergence-Accomodation Conflict in Head Mounted Displays", IEEE Transactions on Visualization and Computer Graphics, vol. 2, No. 7, Jul. 1, 2016, 17 pages.
Kao, Y. and Chao, P., "A New Dual-Frequency Liquid Crystal Lens with Ring-and-Pie Electrodes and a Driving Scheme to Prevent Disclination Lines and Improve Recovery Time", Sensors, Jan. 2011, 14 pages.
Huang, Y.P, et al., "Adaptive Liquid Crystal Lens(LC-Lens) Array for 3D Display and Capturing",m Biomedical Optics and 3D Imaging OSA, Jan. 2012, 3 pages.
International Search Report and Written Opinion correlating to PCT/US2016/067480 dated Mar. 30, 2017, 13 pages.
Written Opinion of the International Examining Authority dated Mar. 7, 2018 for PCT Application No. PCT/US2016/067480, 5 pages.

* cited by examiner

RESONANT MODULATION OF VARIFOCAL LIQUID MEMBRANE LENS TO PROVIDE MULTIPLE CONCURRENT FOCAL PLANES IN VR DISPLAY FOR REALISTIC FOCUS CUES

CROSS-REFERENCE TO RELATED APPLICATIONS

The present application claims priority to U.S. Patent Application Ser. No. 62/321,819, entitled "Resonant Modulation of Varifocal Liquid Membrane Lens to Provide Multiple Concurrent Focal Planes in VR Display for Realistic Focus Cues" and filed on Apr. 13, 2016, the entirety of which is incorporated by reference herein.

BACKGROUND

Field of the Disclosure

The present disclosure relates generally to stereoscopic near-eye displays, and more particularly to providing visual cues for depth perception in stereoscopic near-eye displays.

Description of the Related Art

In a conventional stereoscopic near-eye virtual reality (VR) display system, two-dimensional (2D) VR imagery is focused at a fixed depth from the user's eyes, whereas the depth of the objects in the 2D VR imagery may vary. This results in conflicting information between the vergence cues and accommodation cues utilized by the human visual system. This conflict, frequently referred to as the "accommodation-vergence conflict," often can lead to eye fatigue, headache, or other user discomfort. Moreover, the 2D VR imagery typically is rendered at only one fixed focal plane, and thus the user typically cannot choose to accommodate on a different focal plane as the user otherwise would be able to in an actual 3D environment. This inability to change focal planes with the appropriate corresponding visual cues negatively impacts the user's sense of immersion in the virtual environment represented by the VR imagery.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-7 illustrate techniques for resolving the accommodation-vergence conflict often found in stereoscopic near-eye VR displays through the modulation of a pair of liquid membrane lenses through which a user views VR image content displayed on a near-eye display assembly. The pair of liquid membrane lenses are modulated so as to cyclically and continuously vary the focal power exhibited by the liquid membrane lenses. Further, in some embodiments, the sequence of display frames representing the VR image content are focally rendered such that the sequence alternates or iterates between frames rendered for different discrete focal lengths of a set of focal lengths. The modulation of the liquid membrane lenses may be synchronized to the display frame clock signal used to control the timing of the display of the display frames of the sequence. Thus, the varying focal length of the lens system employing the liquid membrane lenses is synchronized to the focal planes or focal lengths for which the corresponding frames were rendered. As the frames may be displayed at a rate greater than the persistence-of-vision threshold, multiple frames rendered for different focal lengths are perceived by the user as a single image having multiple concurrent focal planes in the resulting 3D VR content. These multiple focal planes provide more effective focus cues for the user's eyes, and thus facilitate an enhanced sense of immersion in the VR scene.

Figure 1:
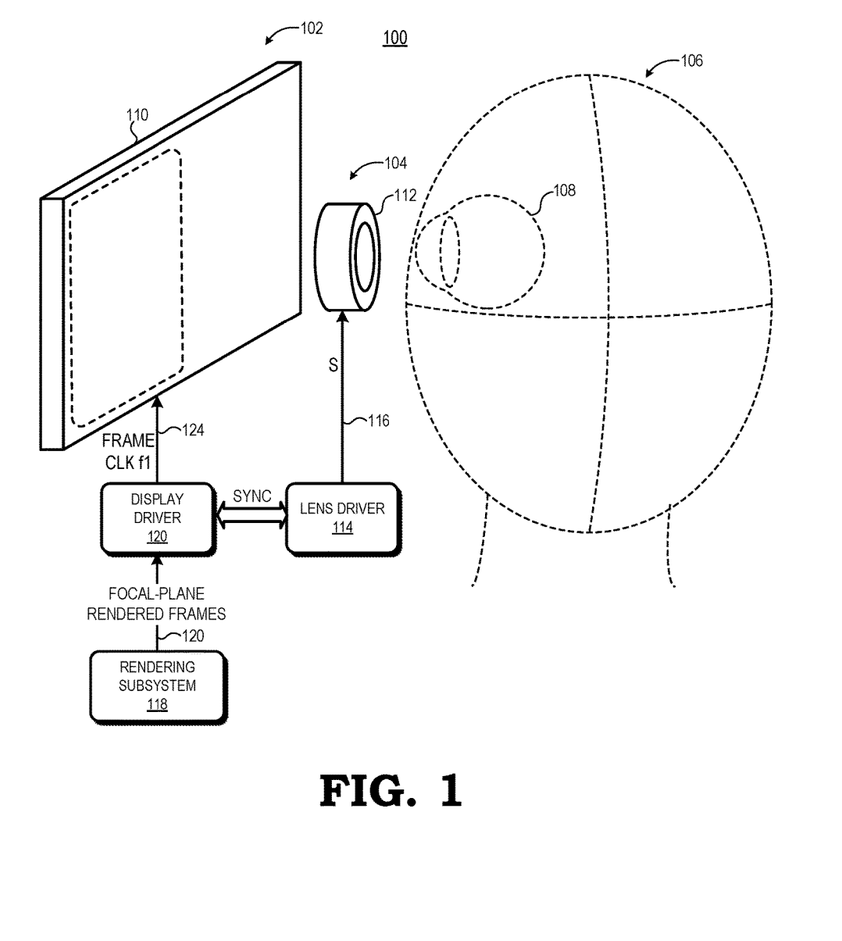
FIG. 1 is diagram illustrating a near-eye display system utilizing a modulated varifocal liquid membrane lens synchronized with the display of focally-rendered imagery to provide a perceived sense of multiple concurrent focal planes in displayed VR imagery in accordance with some embodiments.

FIG. 1 illustrates an example near-eye display system 100 utilizing synchronized modulation of a varifocal liquid membrane lens assembly synchronized with display of correlated focally rendered display frames in accordance with at least one embodiment. The near-eye display system 100 comprises a display assembly 102 and a lens assembly 104 mounted on or near a user's head 106 (e.g., as a head-mounted display (HMD)). The display assembly 102 comprises one or more display panels, with each display panel mounted at a corresponding fixed distance from the eyes 108 of the user. In the illustrated embodiment, the display assembly 102 comprises a single display panel 110 that is logically divided into separate left and right regions, with the left region used to display VR imagery for the left eye of the user, and the right region used to display VR imagery for the right eye of the user. In other embodiments, the display assembly 102 may comprise two display panels 110, one for each eye 108. In yet other implementations, the display assembly 102 may be implemented using more than two display panels 110.

The lens assembly 104 comprises a set of lenses or other optical elements for each eye 108 of the user. Each set of lenses or other optical elements includes a liquid membrane lens 112 disposed between the display assembly 102 and the corresponding eye 108 of the user and thus facing the display panel 110. The set further may include one or more fixed focal power lenses aligned with the liquid membrane lens 112, with the one or more fixed focal powered lenses providing most of the focusing power of the set, while the liquid membrane lens 112 modulates the focus by a relatively small amount (e.g., about 1 to 2 diopters). Although FIG. 1 illustrates only one liquid membrane lens 112 for one eye 108 for ease of illustration, it should be appreciated that another liquid membrane lens 112 would be provided for the other eye 108 and would be implemented and operated in the same manner described herein.

As the name suggests, a liquid membrane lens employs a membrane containing one or more liquids (fluid) at an aperture of the lens, and shape, size, or other physical characteristic of the membrane is modified through application of a current or a voltage. This modification to the membrane or fluid(s) contained therein results in a corresponding change in the focal power of the liquid membrane lens. This change may be implemented using an electro-optical approach in which the membrane contains two fluids with different refractive indices (e.g., oil and water), and thus forming a diopter, and the radius of curvature of the meniscus between the two fluids is changed through application of an electrostatic field, thereby resulting in a corresponding change in the focal length of the lens. In an electro-optical implementation, a current is applied to a ring surrounding the membrane, which causes the ring to constrict or expand based on the magnitude of the current, which in turn deforms the membrane and thus causing a change in the focal power. Alternatively, a voice bobbin may be used to press against a periphery of the membrane responsive to application of current or voltage, and the resulting deformation in the membrane modifying the focal power of the lens.

In a conventional application of liquid membrane lenses, the current applied to the lens is changed as relatively large discrete steps to step change the focal power of the lens from one focal length to another focal length. However, when a liquid lens membrane is subjected to this discrete change, its physical properties are such that the liquid lens membrane exhibits a dampening or settling effect, which typically results in the liquid lens membrane having a relatively long switching time (e.g., 16 milliseconds (ms)) that generally is unsuitable for VR applications. However, when the liquid membrane lens is controlled so as to continuously change the focal length (that is, without large step changes) via application of a sinusoidal signal or other similar continuously varying waveform, while the damping effect is still present the liquid membrane lens 112 responds with a focal modulation that has the same frequency and is temporally phase shifted from the driving signal. As such, this is readily compensated for by phase-shifting a driving signal for the liquid membrane lens 112 so that the liquid membrane lens 112 and display rendering are appropriately synchronized. In particular, the membrane/fluid configuration of a liquid membrane lens causes the liquid membrane lens to exhibit a resonant frequency, and when modulated at this resonant frequency the liquid membrane lens is particularly efficient in changing its focal power. To illustrate, the EL-16-40-TC liquid membrane lens available from Optotune Switzerland AG exhibits a resonant frequency of approximately 400 hertz at a driving signal cycling between −50 milliamps (mA) and +50 mA, and when driven at this resonant frequency, exhibits an ability to change focal states in 1.3 ms. This ability, coupled with the use of a low-persistence display system in which the pixels of each frame are illuminated for only a short time compared to the varifocal modulation period of the liquid membrane lens 112, enables the creation or perception of a nearly constant focal plane for each frame rendered and displayed.

The near-eye display system 100 utilizes this fast focal power switching exhibited by the liquid membrane lens 112 when modulated to enable the lens assembly 104 to cyclically vary the overall focal power of the lens assembly 104 while providing focally-rendered imagery synced to the change in the focal power. To this end, the system 100 includes a lens driver 114 to generate at a driving signal 116 (also denoted herein as "driving signal S") that comprises a continuously varying cyclical/periodic signal having at least one non-zero frequency component. This driving signal 116 is input to each of the liquid membrane lenses 112, which in turn causes each liquid membrane lens 112 to vary its focal power accordingly. Typically, there is an approximately linear relationship between the amperage of the driving signal 116 and the focal power exhibited by the liquid membrane lens 112, and thus the focal power of the liquid membrane lens 112 approximately follows the amplitude of the driving signal 116.

Concurrently, a rendering component 118 renders, for each eye of the user, a corresponding sequence 120 of display frames for display by the display assembly 102 via a display driver 122 of the system 100, wherein the sequence 120 of display frames comprising 3D VR image content to be displayed. The rendering component 118 employs focal-based rendering such that each rendered frame is rendered for a corresponding focal length of a set of specified focal lengths, and such that the sequence 120 of display frames cyclically sequences through the set of focal lengths. For each display frame of the sequence 120, the display driver 122 controls the display assembly 102 to display the display frame in accordance with a frame clock signal 124 that sets the frame rate for the display assembly 102. As described in greater detail herein, the driving signal 116 is synchronized to the frame clock signal 124 such that frame clock signal 124 has a frequency that is an integer multiple of the frequency of the driving signal 116 so that there is a fixed phase relationship between the two signals and such when a display frame rendered for a particular focal plane is displayed, the liquid membrane lens 112 exhibits a focal power correlating to that focal plane at that time. As a result, the instantaneous focal power of the liquid membrane lenses 112 and the rendering and display of VR imagery at the display assembly 102 are synchronized such that the display frames displayed at the display assembly 102 are rendered so as to cycle through a set of different focal planes/lengths, and the liquid membrane lenses 112 of the lens assembly 104 are modulated so as to provide, at the time of display of each display frame, a focal power correlated to the focal plane/length for which the display frame was rendered.

Figure 2:
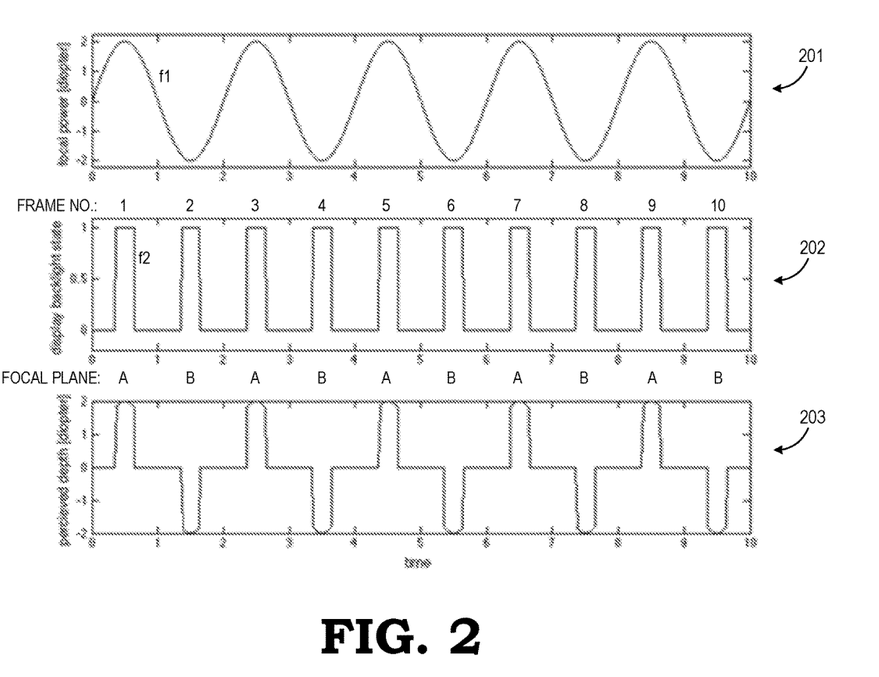
FIG. 2 is a diagram illustrating example waveforms representing a dual-focal-depth implementation of the near-eye display system of FIG. 1 in accordance with some embodiments.

FIG. 2 illustrates an example of this synchronized operation between the focal-plane-rendered display frames and the periodic modulation of the focal power of the liquid membrane lenses 112 of the near-eye display system. FIG. 2 in particular shows a set of waveforms, including a varifocal power waveform 201, a frame display waveform 202, and a perceived depth waveform 203. The varifocal power waveform 201 represents the focal power of the liquid membrane lens 112 over time. In this example, the driving signal 116 output by the lens driver 114 is composed of a sinusoidal signal having a frequency f1, and due to the approximately linear relationship between the driving signal 116 and the focal power response of the liquid membrane lens 112, the resulting modulation of the focal power of the liquid membrane lens 112 has a sinusoidal form with frequency f1. That is, the amplitude and frequency of the varifocal power waveform 201 exhibited by the liquid membrane lens 112 substantially tracks the amplitude and frequency of the driving signal 116 input to the liquid membrane lens 112. As noted above, a liquid membrane lens typically operates considerably more efficiently when modulated at its resonant frequency, or a harmonic thereof (that is, integer multiple of the resonant frequency). Accordingly, to conserve power consumption, in at least one embodiment a liquid membrane lens having a harmonic frequency at or near the frequency f1 may be selected or manufactured for use as the liquid membrane lens 112. To illustrate, there typically is a relatively simple relationship between the membrane properties and geometry and the fundamental resonant frequency of a liquid membrane lens or other vibrating circular membranes, as represented in the expression:

$$f_r \cong 0.766 \sqrt{\frac{T/\sigma}{D}}$$

where $f_r$ represents the fundamental resonant frequency, T represents the tension of the membrane in Newtons/meter, σ represents the density of the membrane in kilograms per square meter, and D represents the diameter of the membrane in meters. Based on this expression, a liquid membrane lens may be selected or manufactured with the appropriate tension, diameter, and density to provide a resonant frequency near or equal to the intended frequency of modulation of the liquid membrane lens 112.

The frame display waveform 202 represents the timing of the display of the sequence 120 of display frames at a frequency f2 (e.g., 60 hertz (Hz), 120 Hz, 240 Hz, etc.). In at least one embodiment the display assembly 102 employs one or more display panels 110 that provide low persistence display of display frames. In such low-persistence display panels, the duration at which the display panel emits light for a particular display frame is substantially less than the overall period between display frames. To illustrate, for a 120 Hz frame rate, a display frame is displayed every 8.3 ms; however, rather than displaying the display frame for most or all of the 8.3 ms duration, in a low-persistence display panel the display frame may be displayed for only a portion of the 8.3 ms duration, such as, for example, only 4.0 ms. The manner in which the display of a frame is controlled depends on the particular technology of the display panel. In backlighted display panels, such as liquid crystal display (LCD)-based and light emitting diode (LED)-based display panels, the actual duration of display of a frame is controlled by the activation of a backlight which is used to provide the light source for the pixels of the display panel. In organic LED (OLED)-based display panels, each pixel serves as its own separate light source, and thus the duration of display of a frame is controlled by the activation of the pixels themselves. In the particular example of FIG. 2, the frame display waveform 202 represents the activation state of a backlight of the display panel 110, such that when the waveform 202 is "high" or at state 1, the backlight is activated and thus a frame is being displayed, and when at "low" or state "0" the backlight is deactivated and thus a frame is not being displayed. A similar waveform would be exhibited for the activation of pixels for each display frame in an OLED-based implementation of the display panel 110. As noted above, this low persistence of illumination for the pixels of any given frame being displayed results in a frame being illuminated for a short time compared to the period or duration of the cycle in the focal power of the liquid membrane lens 112 as it is modulated as shown by waveform 201, results in the focal power of the liquid membrane lens 112 being effectively nearly constant for the duration of the display of the frame, and thus providing an effectively constant overall focal power for the lens assembly 102 for the duration of the display of that frame.

In at least one embodiment, the display frame rate (that is, the frequency f2 of the frame display waveform 202) is an integer multiple of the frequency f1 of the varifocal power waveform 201 (that is, f2=N×f1, where N is an integer greater than one), and thus there is a fixed phase relationship between the waveforms 201, 202. This fixed phase relationship, in effect, synchronizes the instantaneous focal power of the liquid membrane lens 112 to the timing of the display of display frame such that display frames are displayed at the same instantaneous focal power(s) in each cycle. To illustrate, in the depicted example the waveforms 201, 202 are synchronized such that each display frame is actively displayed either at a point in the cycle where the focal power of the liquid membrane lens 112 is at its maximum focal power (+2 diopters in this example) or at a point in the cycle where the focal power at its minimum focal power (−2 diopters in this example). Thus, if numbering each displayed frame in the waveform 202 from left to right starting at 1, frames 1, 3, 5, 7, and 9 are actively displayed at the maximum peak of the varifocal power waveform 201, whereas frames 2, 4, 6, 8, and 10 are actively displayed at the minimum peak of the varifocal power waveform 201. It should be appreciated that while this particular configuration provides for the display frames to be actively displayed during the turning points, or zero-derivative points, in the varifocal power waveform 201 as there is a larger margin for timing error at these points, this particular phase relationship is not required. To illustrate, the phase relationship between the waveforms 201, 202 may be configured such that frames 1, 3, 5, 7, and 9 are actively displayed when the varifocal power waveform is at +1 diopters, while frames 2, 4, 6, 8, and 10 are actively displayed when the varifocal power waveform is at −1 diopters.

The impact of this synchronization on the user is represented by the perceived depth waveform 203, which illustrates the focal length perceived by the user for each displayed frame when viewed through the liquid membrane lens 112. As shown, for frames 1, 3, 5, 7, and 9, the perceived focal length is +2 diopters, and for frames 2, 4, 6, 8, and 10, the perceived focal length is −2 diopters. Accordingly, the rendering component 118 leverages this alternating perceived focal length to render each frame in the sequence 120 for a focal plane correlating to the perceived focal length that will occur at the time the frame is displayed and viewed by the user through the liquid membrane lens 112. To illustrate, assuming that the liquid membrane lens 112 is the only lens impacting focal length, frames 1, 3, 5, 7, and 9 are rendered based on a focal plane "A" that corresponds to the perceived focal length of +2 diopters, whereas frames 2, 4, 6, 8, and 10 are rendered based on focal plane "B" that corresponds to the perceived focal length of −2 diopters. As a result, the sequence 120 of frames repeatedly alternates between a frame rendered for the focal plane "A" and a frame rendered for the focal plane "B". Consequently, due to the persistence-of-vision effect of the human vision system, the user will concurrently perceive two distinct focal planes with the corresponding appropriate focal cues, and thus provide an improved immersive experience over conventional near-eye display systems that provide only a single perceived focal plane.

Figure 3:
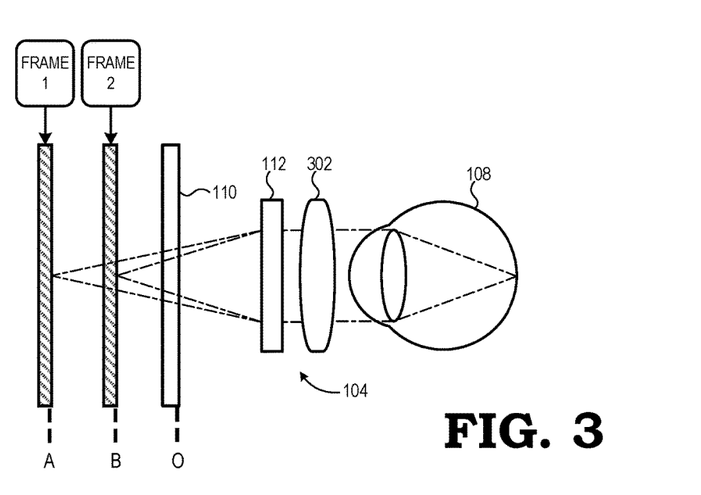
FIG. 3 is a diagram illustrating the two perceived focal lengths obtained by the implementation of FIG. 2 in accordance with some embodiments.

This perceived concurrent dual focal length result is depicted more fully by FIG. 3, which shows a side view of the lens assembly 104 and display panel 110 of the near-eye display system 100 implementing the configuration represented by the waveforms 201-203 of FIG. 2. In this example, the lens assembly 104 includes a fixed focal power lens 302 in line with the liquid membrane lens 112, with the fixed focal power lens 302 providing much of the overall focusing power of the lens assembly 104 so as to minimize aberrations. As shown in FIG. 3, the display panel 110 is at a fixed distance from the eye 108 and thus, when the liquid membrane lens 112 is not being modulated, is perceived as being at a fixed focal plane (designated focal plane "0" in FIG. 3) by the user. However, when the liquid membrane lens 112 is modulated as shown in the varifocal power waveform 201 and the sequence 120 of frames is focally-rendered and displayed within the persistence-of-vision threshold as shown with reference to the frame display waveform 202, two concurrent focal lengths, or focal planes, are perceived by the user. To illustrate, as noted above, frame 1 of the sequence 120 is rendered based on a focal plane A (which accounts for the fixed focal power of the lens 302 as well), whereas frame 2 of the sequence is rendered based on a focal plane B. Thus, when frame 1 is displayed, the liquid membrane lens 112 exhibits a focal power correlated to the focal plane A, and when frame 2 is subsequently displayed, the liquid membrane lens 112 exhibits a focal power correlated to the focal plane B. However, due to visual persistence, frames 1 and 2 are perceived as effectively displayed concurrently, and as each was rendered at, and perceived at, a different focal plane, the user in effect perceives the displayed imagery has having two focal planes, A and B.

Figure 4:
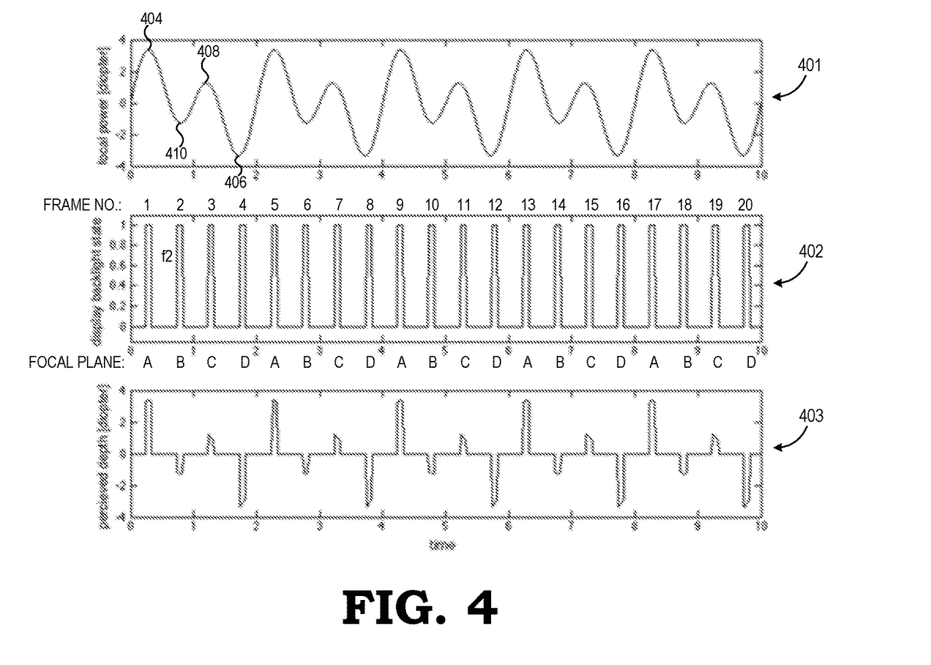
FIG. 4 is a diagram illustrating example waveforms representing a quad-focal-depth implementation of the near-eye display system of FIG. 1 in accordance with some embodiments.
Figure 5:
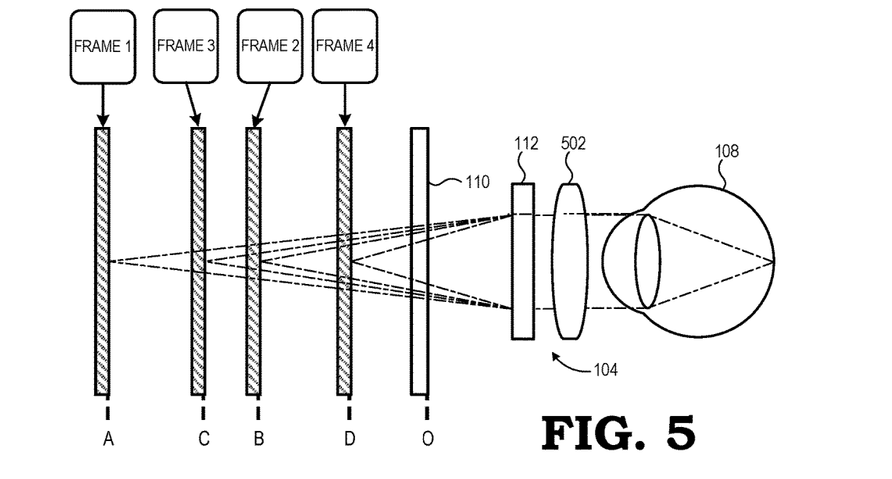
FIG. 5 is a diagram illustrating the four perceived focal lengths obtained by the implementation of FIG. 4 in accordance with some embodiments.

Although FIGS. 2 and 3 illustrate an example implementation whereby the modulation of the liquid membrane lenses 112 and corresponding synchronous display of a focally-rendered sequence 120 of display frames results in user perception of two concurrent focal planes, similar techniques may be used to provide more than two concurrent focal planes. To illustrate, FIGS. 4 and 5 depict an example implementation that provides four perceived concurrent focal planes. Although the principles described herein may be utilized to provide more than four focal planes, the human eye has a typical accommodation range of 0-4 diopters and a 1 diopter depth-of-focus (DOF), and thus 2-4 discrete concurrent focal planes should be sufficient to yield a realistic varifocal display.

FIG. 4 depicts a set of waveforms, including a varifocal power waveform 401, a frame display waveform 402, and a perceived focal depth waveform 403. As with waveform 201 of FIG. 2, the varifocal power waveform 401 represents the cyclically and continuously varying focal power of the liquid membrane lens 112 over time. In this example, the driving signal 116 output by the lens driver 114 is composed of two sinusoidal signals of different amplitudes and different frequencies (e.g., f1 and 2*f1 in this example), with the resulting combination of these two sinusoidal signals modulating the liquid membrane lens 112 to have an absolute maximum focal power 404, an absolute minimum focal power 406, a local maximum focal power 408, and a local minimum focal power 410 for each cycle of the resulting waveform. As noted above, the liquid membrane lens 112 may be selected or designed so that the frequency f1 is at or near the resonant frequency of the liquid membrane lens, or a harmonic thereof. The frame display waveform 202 represents the timing of the display of the sequence 120 of display frames at a frequency f2, which in this example is four times the frequency f1 (f2=4×f1, N=4) and with the illustrated fixed phase relationship.

As a result, the waveforms 401, 402 are synchronized so as to have a fixed phase relationship so that each display frame of the sequence 120 is actively displayed at one of the maximums or minimums of the cyclical focal power of the liquid membrane lens 112. In the particular example, if numbering each displayed frame in the waveform 402 from left to right starting at 1, frames 1, 5, 9, 13, and 17 are actively displayed at the absolute maximum focal power 404 of their respective cycles of the waveform 402, frames 2, 6, 10, 14, and 18 are actively displayed at the local minimum focal power 410 of their respective cycles of the waveform 402, frames 3, 7, 11, 15, and 19 are actively displayed at the local maximum focal power 408 of their respective cycles of the waveform 402, and frames 4, 8, 12, 16, and 20 are actively displayed at the absolute minimum focal power 406 of their respective cycles of the waveform 402. As similarly noted above, while the example of FIG. 4 provides for the display frames to be actively displayed during the turning points, or zero-derivative points, in the varifocal power waveform 401, this particular phase relationship is not required.

As shown by the perceived focal length waveform 403, as a result of this synchronization the focal power perceived by the user through the liquid membrane lens 112 cycles from approximately +3 diopters, to −1 diopter, to +1 diopter, to −1 diopter as the sequence 120 of display frames progresses. Accordingly, the rendering component 118 renders the display frames of the sequence 120 based on a select one of four different focal planes, with the particular focal plane selected for a display frame corresponding to the perceived focal power at the time that that frame is to be displayed. To illustrate, assuming that the liquid membrane lens 112 is the only lens impacting focal length, frames 1, 5, 9, 13, and 17 are rendered based on a focal plane "A" that corresponds to the perceived focal length of +3 diopters, frames 2, 6, 10, 14, and 18 are rendered based on a focal plane "B" that corresponds to the perceived focal length of −1 diopters, frames 3, 7, 11, 15, and 19 are rendered based on a focal plane "C" that corresponds to the perceived focal length of +1 diopters, and frames 4, 8, 12, 16, and 20 are rendered based on a focal plane "D" that corresponds to the perceived focal length of −3 diopters. As a result, the sequence 120 of frames repeatedly sequences between a frame rendered for the focal plane "A" a frame rendered for the focal plane "B", a frame rendered for the focal plane "C", and a frame rendered for the focal plane "D." If these four frames in each sequence are displayed within the persistence threshold of the human vision system, the user will concurrently perceive four distinct focal planes with the corresponding appropriate focal cues, with the improved immersive experience that entails.

FIG. 5 shows this perceived concurrent quad focal plane arrangement in more detail. In particular, FIG. 5 shows a side view of the lens assembly 104 and display panel 110 of the near-eye display system 100 implementing the configuration represented by the waveforms 401-403 of FIG. 4. In this example, the lens assembly 104 includes a fixed focal power lens 502 in line with the liquid membrane lens 112. While the display panel 110 is at a fixed distance from the eye 108 (i.e., at focal plane "0"), when the liquid membrane lens 112 is modulated as shown in the varifocal power waveform 401 and the sequence 120 of frames is focally-rendered and displayed as shown with reference to the frame display waveform 402, four concurrent focal lengths, or focal planes, are perceived by the user. To illustrate, as noted above, frame 1 of the sequence 120 is rendered based on the focal plane A, frame 2 is rendered based on the focal plane B, frame 3 is rendered based on the focal plane C, and frame 4 is rendered based on the focal plane D. Thus, when frames 1-4 are displayed in sequence, with the liquid membrane lens 112 providing the correlated focal power at the time of display of each frame, frames 1-4 are effectively perceived by the user as displayed concurrently, and displayed at their respective focal lengths, and thus the user perceives frames 1-4 as a single image with four discrete focal planes A, B, C, and D.

Figure 6:
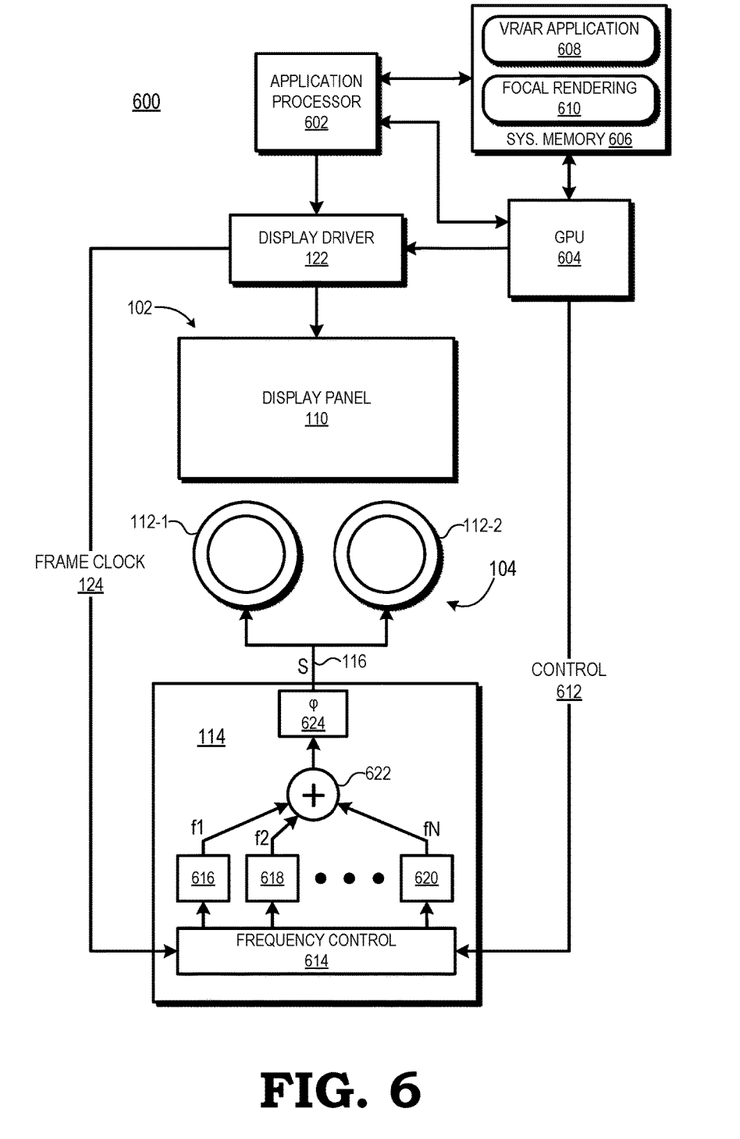
FIG. 6 is a diagram illustrating a hardware implementation of the near-eye display system of FIG. 1 in accordance with some embodiments.

FIG. 6 illustrates an example hardware configuration 600 of the near-eye display system 100 in accordance with at least one embodiment. The hardware configuration 600 includes the display assembly 102, the lens assembly 104, the lens driver 114, the display driver 122, an application processor 602, a graphics processing unit (GPU) 604, and a system memory 606. The lens assembly 104 includes a liquid membrane lens for the left eye (denoted "liquid membrane lens 112-1") and a liquid membrane lens for the right eye (denoted "liquid membrane lens 112-2"), as well as one or more fixed focal power lenses (not shown) for each eye. In this example, the display assembly 102 includes a single display panel 110 used to display left-eye imagery and right-eye imagery concurrently.

As a general operational overview, the application processor 602 executes a VR/AR application 608 (stored in, for example, the system memory 606) to provide VR/AR functionality for a user. As part of this process, the GPU 604 executes a focal rendering routine 610 (which may be part of the VR/AR application 608 or a separate routine) to focally render, for each eye, a sequence of display frames (e.g., sequence 120, FIG. 1) display at the display panel 110, with the paired sequences of images representing a 3D VR or AR scene when viewed by the user through the liquid membrane lenses 112-1, 112-2. The display driver 122 operates to display left-right paired display frames in sequence in a low-persistence mode such that each left-right pair of display frames is displayed for only a relatively small fraction of the frame rate period.

In parallel, the lens driver 114 drives the liquid membrane lenses 112-1, 112-2 using the driving signal 116 so as to continuously and cyclically modulate the focal power of the liquid membrane lenses 112-1, 112-2 in synchronization with the display of the paired sequence of frames such that the instantaneous focal power exhibited by the lenses 112-1, 112-2 at the time of display of a left-right pair of display frames is correlated to the focal plane for which the left-right pair of display frames was rendered. To this end, the lens driver 114 includes an input to receive the frame clock 124 used by the display driver 122 for timing of display of display frames at the display panel 110, an input to receive control information 612, and an output to provide the driving signal 116. The control information 612 includes information pertaining to the parameters for generating the driving signal 116, such as the frequency of each sinusoidal component to be incorporated into the driving signal 116, the amplitude of each sinusoidal component, the phase offset to be implemented between these sinusoidal components, or the phase offset to be implemented between the frame clock 124 and the driving signal 116, and the like.

In the depicted example, the lens driver 114 further includes a frequency control component 614, a plurality of signal generators, such as signal generators 616, 618, and 620, a signal combiner 622, and an offset component 624. As explained above, the driving signal 116 may be composed of a one or more sinusoids of frequency f1, and in such instances the signal generators may comprise sine wave generators that may use the frame clock 124 as a feed or reference signal. In the event that the driving signal 116 is composed of only a single sinusoid, the frequency control component 614 controls a single one of the signal generators, e.g., signal generator 616, to generate a sinewave signal having the frequency f1 and the desired amplitude (denoted signal "S" in FIG. 6). This single sinewave signal is passed through to the offset component 624, which delays the sinewave signal by a particular delay period specified by the frequency control component 614 so as to introduce the desired phase relationship between the sinewave signal and the frame clock 124, and the resulting delayed sinewave signal is output as the driving signal 116.

In the event that the driving signal 116 is composed of multiple sinusoids at frequency f1 but with different phase offsets, the frequency control component 614 controls a number of the signal generators equal to the number of sinusoids in the driving signal to generate a corresponding sinewave signal having the frequency f1, an indicated amplitude, and an indicated phase offset, and the resulting sinewave signals are combined by the signal combiner 622 and the resulting signal (denoted S in FIG. 6) is input to the offset component 624, which introduces the appropriate delay into the signal so as to implement the intended phase relationship between the driving signal 116 and the frame clock 124. The resulting phase-offset signal is then output as the driving signal 116.

Figure 7:
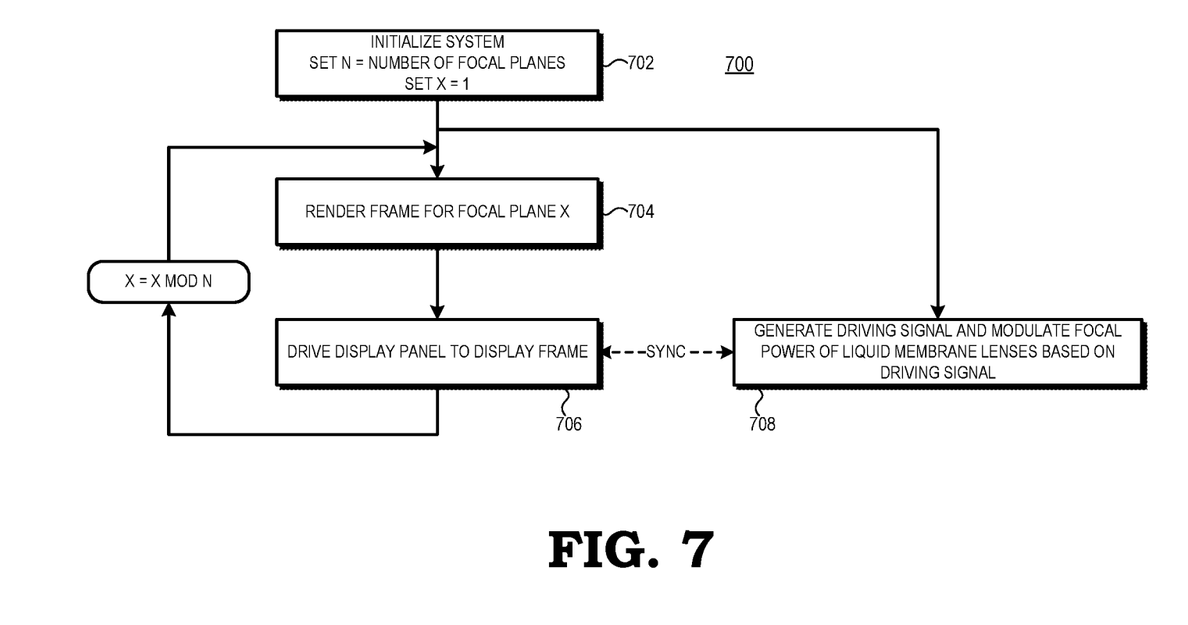
FIG. 7 is a block diagram illustrating a method for synchronized modulation of a varifocal liquid membrane lens assembly to provide multiple concurrent perceived focal planes in accordance with some embodiments.

FIG. 7 illustrates an example method 700 for focal rendering of display frames and synchronized modulation of liquid membrane lenses for providing VR imagery with apparent multiple concurrent focal planes for improved user immersion in accordance with at least one embodiment. For ease of illustration, the method 700 is described in the example context of the hardware configuration 600 of FIG. 6. The method 700 initiates at block 702, wherein the VR/AR application 608 determines the number N of perceived concurrent focal planes to be implemented for the near-eye display system 100. This number may be fixed, or may be selected based on various considerations, such as the processing power of the GPU 215, the complexity of the VR world to be rendered, the focal power range of the lens assembly 104, and the like. As discussed above, two to four focal planes (N=2, 3, or 4) typically is sufficient to provide realistic immersion. Initialization further may include setting a temporary variable X to 1.

With the system initialized, the hardware configuration 600 performs two processes in parallel: focal-plane-based rendering of paired sequences of display frames; and synchronized modulation of the liquid membrane lenses 112-1, 112-2. For the focal rendering process, at block 704 the VR/AR application 608 instructs the focal rendering routine 610 to render a display frame to represent specified VR or AR image content, and in response the focal rendering routine 610 manipulates the GPU 604 to render a display frame based on a focal plane X using any of a variety of focal rendering techniques, with X being the temporary variable initialized at block 702 and representing the index of a corresponding one of the set of N focal planes implemented by the system 100. The process of block 704 is repeated twice for each iteration, once for each eye, so as to generate a stereoscopic pair of display frames. At block 706, the display driver 122 drives the display panel 110 to concurrently display the pair of display frames using the timing provided by the frame clock 124. As noted above, the display driver 122 may implement a low-persistence display whereby the display frames are actively displayed for only a portion of the corresponding period of the frame clock 124, and thus enabling the persistence-of-vision effect. The variable X is then shifted to the index of the next focal plane in the set of N focal planes (e.g., X=X MOD N), and the process of blocks 704 and 706 is repeated for the next focal plane. The result of iterations of blocks 704 and 706 is a sequence of display frames that repeatedly cycles through the N different focal planes.

In parallel, at block 708 the lens driver 114 generates a cyclical, continuously varying driving signal 116 having a frequency that is an integer divisor of the frame rate of the frame clock 124 and which has a fixed phase relationship with the frame clock 124 such that when the liquid membrane lenses 112-1, 112-2 are driven with the driving signal 116, the liquid membrane lenses 112-1, 112-2 exhibit a continuously modulated focal power that is synchronized to the display of the focally-rendered display frames such that when each stereoscopic pair of display frames is displayed, the lenses 112-1, 112-2 exhibit a focal power correlated to the focal plane for which the pair of display frames was rendered. This focal-plane specific rendering, coupled with the persistence-of-vision effect, results in the user perceiving two or more display frames displayed in series as being displayed as a single image with multiple focal planes, and when this effect is repeated again and again throughout the sequence of display frames representing the VR imagery of a 3D VR scene, the user is more fully immersed in the VR scene due to the improve focal cues provided by the multiple concurrent focal planes perceived by the user to be present in the displayed imagery.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A near-eye display system comprising:
   a display assembly comprising at least one display panel;
   a display driver to drive the display assembly to display a sequence of frames based on a frame clock signal having a first frequency;
   a pair of liquid membrane lenses facing the display assembly;
   a lens driver having an output coupled to an input of each of liquid membrane lenses of the pair, the lens driver to generate at the output a periodic, continuously variable driving signal having a second frequency, wherein the first frequency is twice the second frequency;
   a rendering component to render the sequence of frames such that the sequence of frames repeatedly alternates between a frame rendered for a first focal length and a frame rendered for a second focal length; and
   wherein the driving signal controls the amplitude of the driving signal so as to cause a focal power of each liquid membrane lens to cycle between a maximum focal power and a minimum focal power at the second frequency such that display of each frame rendered for the first focal length is synchronized to a first point in a corresponding cycle at which the liquid membrane lens has a first focal power and such that display of each frame rendered for the second focal length is synchronized to a second point in a corresponding cycle at which the liquid membrane lens has second focal power.

2. The near-eye display system of claim 1, wherein:
   the second frequency is substantially equal to a resonant frequency or a harmonic frequency of the liquid membrane lens.

3. The near-eye display system of claim 1, wherein:
pixels of the display panel for of each frame of the sequence of frames are illuminated for a duration less than a duration of the period of the frame clock signal; and
the first point and second point are synchronized to timing of illumination of pixels of the display panel for the corresponding frames.

4. The near-eye display system of claim 1, wherein:
the first focal power is substantially equal to the maximum focal power; and
the second focal power is substantially equal to the minimum focal power.

5. The near-eye display system of claim 1, wherein the sequence of frames represents virtual reality (VR) content for stereoscopic display.

6. A near-eye display system comprising:
a display assembly comprising at least one display panel;
a display driver to drive the display assembly to display a sequence of frames based on a frame clock signal having a first frequency;
a pair of liquid membrane lenses facing the display assembly;
a lens driver having an output coupled to an input of each of liquid membrane lenses of the pair, the lens driver to generate at the output a periodic, continuously variable driving signal having a second frequency, wherein the first frequency is an integer multiple of the second frequency;
a rendering component to render the sequence of frames such that the sequence of frames repeatedly sequences through a frame rendered for a first focal length, a frame rendered for a second focal length, a frame rendered for a third focal length, and a frame rendered for a fourth focal length;
wherein the driving signal controls the amplitude of the driving signal so as to cause a focal power of the liquid membrane lens to cycle between a total maximum focal power, a local minimum focal power, a local maximum focal power, and a total minimum focal power at the second frequency such that display of each frame rendered for the first focal length is synchronized to a first point in a corresponding cycle at which the liquid membrane lens has a first focal power, display of each frame rendered for the second focal length is synchronized to a second point in a corresponding cycle at which the liquid membrane lens has second focal power, display of each frame rendered for the third focal length is synchronized to a third point in a corresponding cycle at which the liquid membrane lens has third focal power; and display of each frame rendered for the fourth focal length is synchronized to a fourth point in a corresponding cycle at which the liquid membrane lens has fourth focal power; and
wherein the first frequency is four times the second frequency.

7. The near-eye display system of claim 6, wherein:
the second frequency is substantially equal to a harmonic frequency of the liquid membrane lens.

8. The near-eye display system of claim 6, wherein the near-eye display system is a head mounted display system.

9. The near-eye display system of claim 6, wherein the sequence of frames represents virtual reality (VR) content for stereoscopic display.

10. In a near-eye display system, a method comprising:
driving a display panel to display a sequence of frames based on a frame clock signal having a first frequency;
modulating a pair of liquid membrane lenses facing the display panel to continuously and cyclically vary a focal power of each of the liquid membrane lenses at a second frequency, wherein the first frequency is twice the second frequency;
rendering the sequence of display frames such that the sequence of frames repeatedly alternates between a frame rendered for a first focal length and a frame rendered for a second focal length; and
wherein modulating the pair of liquid membrane lenses comprises continuously varying a focal power of each liquid membrane lens so that each liquid membrane lens cycles between a maximum focal power and a minimum focal power at the second frequency such that display of each frame rendered for the first focal length is synchronized to a first point in a corresponding cycle at which the liquid membrane lens has a first focal power and such that display of each frame rendered for the second focal length is synchronized to a second point in a corresponding cycle at which the liquid membrane lens has second focal power.

11. The method of claim 10, wherein:
the second frequency is substantially equal to resonant frequency or a harmonic frequency of the pair of liquid membrane lenses.

12. The method of claim 10, wherein:
driving the display panel comprises driving the display panel to display each frame of the sequence such that illumination of pixels of the display panel for the frame has a duration less than a duration of the period of the frame clock signal; and
the first point and second point are synchronized to timing of the illumination of pixels of the display panel for the corresponding frames.

13. The method of claim 10, wherein:
the first focal power is substantially equal to the maximum focal power; and
the second focal power is substantially equal to the minimum focal power.

14. In a near-eye display system, a method comprising:
driving a display panel to display a sequence of frames based on a frame clock signal having a first frequency;
modulating a pair of liquid membrane lenses facing the display panel to continuously and cyclically vary a focal power of each of the liquid membrane lenses at a second frequency, wherein the first frequency is an integer multiple of the second frequency;
rendering the sequence of frames such that the sequence of frames repeatedly sequences through a frame rendered for a first focal length, a frame rendered for a second focal length, a frame rendered for a third focal length, and a frame rendered for a fourth focal length;
wherein modulating the pair of liquid membrane lenses comprises continuously varying a focal power of each liquid membrane lens so that each liquid membrane lens cycles between a total maximum focal power, a local minimum focal power, a local maximum focal power, and a total minimum focal power at the second frequency such that display of each frame rendered for the first focal length is synchronized to a first point in a corresponding cycle at which the liquid membrane lens has a first focal power, display of each frame rendered for the second focal length is synchronized to a second point in a corresponding cycle at which the liquid membrane lens has second focal power, display of each frame rendered for the third focal length is synchronized to a third point in a corresponding cycle at which the liquid membrane lens has third focal power; and display of each frame rendered for the fourth focal length is synchronized to a fourth point in a corresponding cycle at which the liquid membrane lens has fourth focal power; and wherein the first frequency is four times the second frequency.

15. The method of claim 14, wherein:

the second frequency is substantially equal to a resonant frequency or a harmonic frequency of the liquid membrane lens.

16. In a near-eye display system, a method comprising:

rendering a sequence of display frames, each display frame rendered for a corresponding focal length of a set of discrete focal lengths;

displaying the sequence of display frames at a display panel with low persistence;

synchronizing modulation of a pair of liquid membrane lenses facing the display panel such that during display of each display frame of the sequence, a focal power exhibited by each of the liquid membrane lenses is correlated to the focal length at which the display frame was rendered;

displaying the sequence of display frames comprises displaying the sequence of display frames at a first frequency; and synchronizing modulation of the pair of liquid membrane lenses comprises continuously and cyclically varying the focal power of each of the liquid membrane lenses at a second frequency, the first frequency being N times the second frequency, wherein N represents the number of discrete focal lengths in the set of discrete focal lengths.

17. The method of claim 16, wherein the sequence of display frames represents virtual reality (VR) content for stereoscopic display.

18. The method of claim 16, wherein N is two.

19. The method of claim 16, wherein N is four.

* * * * *